United States Patent [19]

Walish et al.

[11] Patent Number: 4,970,898

[45] Date of Patent: Nov. 20, 1990

[54] PRESSURE TRANSMITTER WITH FLAME ISOLATING PLUG

[75] Inventors: James E. Walish, Buffalo; Lee A. Mattison, Minneapolis; Thomas P. Peterson, Chanhassen, all of Minn.

[73] Assignee: Rosemount Inc., Eden Prairie, Minn.

[21] Appl. No.: 409,927

[22] Filed: Sep. 20, 1989

[51] Int. Cl.⁵ .............................................. G01L 9/00
[52] U.S. Cl. ...................................... 73/706; 73/723; 73/756
[58] Field of Search ................ 73/706, 708, 728, 722, 73/756, 115, 720, 721, 717, 718, 719, 723, 724, 725, 726, 727, 754; 336/30; 338/4

[56] References Cited

U.S. PATENT DOCUMENTS

| | | | |
|---|---|---|---|
| 3,793,885 | 2/1974 | Frick | 73/398 C |
| 4,068,206 | 1/1978 | Popp | 338/35 |
| 4,227,418 | 10/1980 | Bonner et al. | 361/283 |
| 4,370,890 | 2/1983 | Frick | 73/718 |
| 4,563,903 | 1/1986 | Kohnlechner | 73/727 |
| 4,576,049 | 3/1986 | Kohnlechner | 73/706 |
| 4,586,018 | 4/1986 | Bettman | 338/42 |
| 4,809,555 | 3/1989 | Kunz | 73/727 |

OTHER PUBLICATIONS

Intrinsic Safety by R. J. Redding (1979), p. 154.
Electrical Instruments in Hazardous Locations, Second Edition by Ernest C. Magison—1972, pp. 23–27 and pp. 125–132.

*Primary Examiner*—Donald O. Woodiel
*Attorney, Agent, or Firm*—Kinney & Lange

[57] ABSTRACT

A transmitter that provides an output indicating pressure difference between a line pressure and atmosphere outside the transmitter is made intrinsically safe by coupling the sensor cavity as well as other cavities where ignition can occur to atmosphere only through flame quenching paths. The opening in the transmitter housing in which the sensor is mounted has a plug including a sensor cavity that holds the sensor, and a fitting which is couplable to the pressure line. An isolator is used for transmitting the process pressure to the sensor through an isolator diaphragm acting on an incompressible filling the sensor cavity and transmitting pressure through a hole that is shaped to provide a flame quenching path. The passageway flame isolates the sensor from the process fluid line. The opposite side of the sensor is connected to atmosphere only through paths which are flame quenching because of the passageway shape. The plug is an assembly that can be made easily inserted and removed, and provides intrinsic safety even if there is failure of some of the components such as the isolating diaphragm or welds holding portions of the plug together.

9 Claims, 3 Drawing Sheets

PRESSURE TRANSMITTER WITH FLAME ISOLATING PLUG

BACKGROUND OF THE INVENTION

1. Field of the Invention

The present invention relates to flame arresting or quenching plugs for use with transmitter housings.

2. Description of the Prior Art

Flammable mixtures many times are present in an atmosphere outside a pressure transmitter or in a process fluid which is being sensed by a pressure sensor in the transmitter. Various types of protection reduce the likelihood that an ignition of flammable gas inside the transmitter will ignite a flammable mixture outside the transmitter. Transmitter openings and covers for the openings are now made so as to cool ignited gas inside the transmitter housing as it is venting to a temperature below that needed to ignite a flammable mixture outside the transmitter. The ignited gasses in the transmitter are cooled as they travel along narrow passageways such as flanges or threads between a housing and a cover of the transmitter. As the hot gases move along the passageway, heat is transferred from the flame to the walls forming the passageway. If the passageway is narrow enough, more heat is transferred from the flame to the housing and cover than is produced by the flame, and the flame front cools. If the passageway is also long enough, the flame front can be cooled to a temperature low enough to quench the flame, thereby preventing ignited gases from moving further down the passageway and igniting a flammable mixture outside the transmitter.

Multiple protection can be provided in a single transmitter so that, even if one protection is damaged or fails, another protection arrangement still reduces the likelihood of igniting the flammable mixture outside the transmitter. It is desired in some applications that a flame quenching path effectively contain ignition of a flammable mixture inside the housing even after resilient seals such as O-rings and thin foil barriers such as isolator diaphragms have been damaged or removed, or after isolator liquids have leaked out, or welds have failed.

Flame quenching between the sensor, which includes electrical circuitry capable of generating a spark under fault conditions, and the outside of the transmitter is a problem because there is a need to expose the sensor to the process fluid pressure, and, in the case of a gauge pressure transmitter, there is also a need to expose the sensor to atmospheric pressure outside the transmitter, as well. Flame quenching paths between sensors in a transmitter housing and the outside of the transmitter have been provided, but prior art arrangements such as class I threads are difficult to make in applications for holding a sensor in place and expensive to manufacture.

There is thus a need to provide an easily produced, low cost mounting for a sensor which exposes the sensor to the sensed pressure, while at the same time providing a simple, economical arrangement for containing gases ignited in the sensor cavity.

SUMMARY OF THE INVENTION

The present invention relates to flame isolators for a pressure transmitter. As shown, the transmitter provides an output indicating a pressure difference between a pressure line and an atmosphere outside the transmitter. The transmitter includes a housing forming a wall around an axis of a hole extending into an interior cavity formed in the housing. A circuit in the cavity controls the transmitter's output. A pressure sensor coupled to the circuit senses the pressure difference. A plug inserted in the hole in the pressure transmitter housing is arranged to hold the sensor and provide a passageway which has a shape that flame-isolates the sensor from a pressure line coupled to the outer end of the plug. The plug in the hole has an extended fitting connected to the pressure line at a distal end of the plug. The plug has a sensor cavity which receives the sensor. An isolator diaphragm in the plug or fitting couples line pressure to the sensor via an isolator fluid in a first passageway formed in the plug. The first passageway has a shape resisting movement of a flame along the passageway thus flame-isolating the sensor from the pressure line in case of failure of the isolator diaphragm and loss of isolator fluid.

The plug has a peripheral surface positioned within the hole which is closely spaced adjacent the wall defining the hole. In a preferred embodiment the peripheral surface of the plug and the adjacent wall form an interspace shaped to resist the passage of flame thus flame-isolating any ignited gases from the atmosphere.

In a further preferred embodiment, the plug has a second passageway coupling the sensor to the atmosphere. The second passageway is formed in a shape that resists travel of a flame, and thus flame-isolating the sensor from the atmosphere. The second passageway couples to the atmosphere via the interspace.

DETAILED DESCRIPTION OF THE PREFERRED EMBODIMENTS

Figure 1:
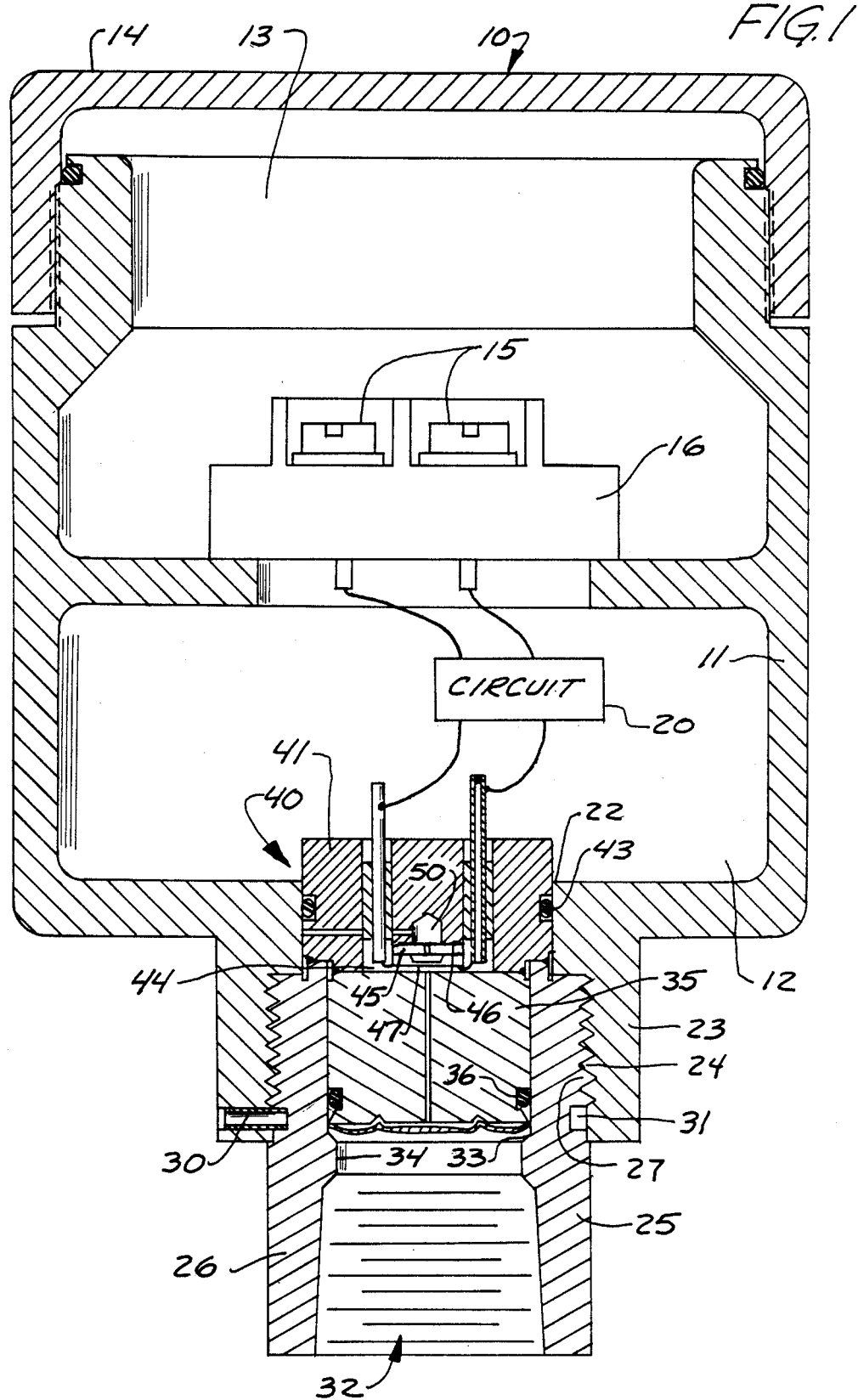
FIG. 1 is a sectional view through a typical transmitter housing having a plug and sensor arrangement made according to the present invention.

A typical transmitter housing illustrated generally at 10 includes a body 11 having a first circuit compartment 12, and a terminal block compartment 13. The terminal block compartment has a threaded cover 14 thereon for access to terminal screws 15 mounted on the terminal block 16.

A circuit is represented at 20 in the circuit compartment. The circuit can be conventional, as now used with two-wire transmitters that are well known in the art.

The transmitter housing has a hole or opening 22 defined in a wall thereof leading to the circuit compartment, and hole 22 leads to the interior of a sleeve 23. The interior surface of sleeve 23 is threaded as at 24 for receiving a plug assembly 25, which includes a sleeve-like fitting 26 that has a threaded neck 27 mating with interior class 1 threads 24 on the interior of the sleeve 23. The threads 24 of sleeve 23 and the threaded neck 27 of plug 26 are class threads to provide for a close fit to insure that there is a flame arresting path defined along this juncture. These threads are expensive to make, so the number of places they are used should be minimized. A roll pin 30 is positioned through a radial opening in the sleeve 23 to extend into a groove 31 in the sleeve-like fitting 26 to provide for an anti-rotation stop for the plug assembly 25.

The sleeve-like fitting 26 has a smaller diameter inner end that fits within the opening 22, and has an internal passageway indicated generally at 32 which includes a passageway portion 33 above a capture ring 34 defined about midway along the length of the sleeve-like fitting 26. The interior passageway portion 33 is of size to receive an isolator block 35, which has an O-ring seal 36 around the periphery thereof that seals on the interior of passageway portion 33. The interior surface of fitting 26 which forms passageway 33 is very precisely machined, and the outer surface of the isolator block 35 is also precisely machined to leave a maximum space of 0.004 inches between the surface of plug 26 which forms the passageway 33 and the outer surface of the isolator block 35. This spacing also provides a flame quenching path of a shape that is of sufficient length and appropriate clearance to arrest or quench a flame which may be venting from the circuit compartment 12 to the exterior.

As can be seen in FIG. 1 the isolator block 35 forms part of a sensor assembly 40. The isolator block 35 is fixed to a sensor support block 41 with a suitable peripheral weld indicated at 42. The sensor support block 41 is cylindrical and fits into the opening 22 in the housing wall, and has an O-ring seal 43 around the periphery at approximately its midsection to seal the opening 22 with respect to the circuit compartment 12. The support block 41 is formed with a suitable recess indicated at 44 on an end thereof facing the isolator block 35. Recess 44 has a support surface that supports a silicon chip diaphragm type pressure sensor 45. Suitable mounting material 46 can be used for mounting a sensor base to the surface of sensor support block 41. The sensor base has a diaphragm section 47 supported thereon to provide for the sensing of pressure present in the recess or chamber 44.

A recess 50 is provided behind the base of the silicon chip 45 and is open to a small diameter hole 51 that is a maximum of 0.015 inches in diameter, and which extends radially outward to an interspace indicated at 52 between the outer periphery of the sensor support block 41 and the surface of hole 22. The interspace 52 is open to the threads 24 retaining the fitting 26.

The sensor support block 41 has a pair of holes 53 that are used for mounting a lead 57 and an oil fill tube 55 which acts as a lead. The isolator block 35 has a flexible isolator diaphragm 35A welded at its periphery to cover the end surface that is facing capture ring 34, and the inner side of the isolator diaphragm 35A opens to a small diameter (0.015 inches) isolator fluid passageway 35B that leads, in turn, to the cavity or chamber 44.

Figure 2:
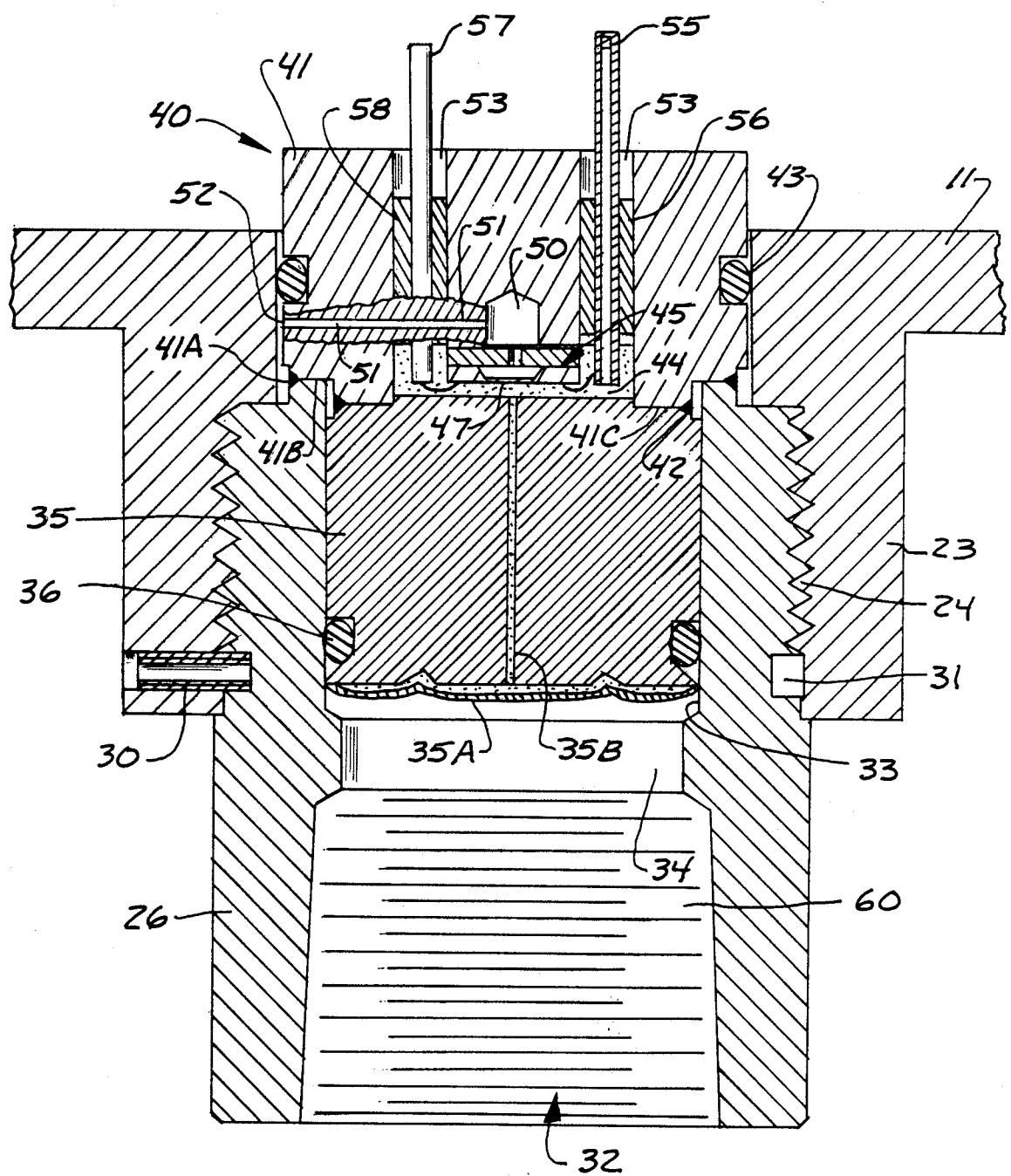
FIG. 2 is an enlarged vertical sectional view of the plug and sensor used in the transmitter housing of FIG. 1.

Chamber 44, passageway 35B and the underside of the diaphragm 35A are filled with a suitable silicone oil through a metallic tube 55, which fits into one of the holes 53 and is held in the hole with a suitable material indicated at 56. The tube 55 is metal, and has a hollow interior through which oil can be filled for filling the isolation passageway 35B, the underside of the diaphragm 35A and the chamber 44 with silicone oil, after which the end of the tube is sealed or closed to hold the oil in place. Tube 55 is connected with a suitable lead to one side of the sensing diaphragm 47 and also used to carry electrical signals to the circuit 20. The other hole 53 has a suitable electrical lead 57 therein and which is held in place with a material 58, such as some type of insulating material. The lead 57 is also connected to the circuit 20 and to the sensor. The opening or hole 51 actually bypasses the openings 53 because it does not open to chamber 44 although in FIG. 2 it is shown in section along with the adjacent opening 53 for convenience.

Small diameter openings 35B and 51 are made by suitable E.D.M. (electron discharge machining) so that the hole sizes can be maintained very small and precise.

The sensor assembly 40 is suitably welded to the isolator block 35 as at 42, as explained, and is also welded to the sleeve-like fitting 26 with a weld 41A, to form the plug assembly 25 that can be mounted in place when the sleeve-like fitting 26 is threaded into the interior of the housing sleeve 23. The block 41 has a shoulder surface 41B that seats on the end surface of the fitting 26. The shoulder 41B forms a short neck 41C that fits into the bore portion 33. The weld 42 is around the periphery of the neck 41C.

The lower portion 60 of the sleeve-like fitting 26 has a standard pipe tap thread on the interior to receive a pressure fitting from a process pressure line or source. The outer surface on the portion of the sleeve-like fitting 26 that extends out of sleeve 23 can be shaped into a hexagon so that it can be removed and installed with a wrench.

Since a transmitter may be used in atmospheres that have flammable mixtures, and has areas that are hard to protect adequately, such as the sensor mounting chamber, adequate flame quenching has been a problem. The isolator block 35 and isolator diaphragm 35A have to be exposed to the process fluid pressure for sensing and an adequate flame quenching path has to be provided even if the isolator diaphragm 35A, for example, has been damaged or ruptured, or the welds 42 and 41A have failed. Such protection is provided in the present device in a low cost manner.

The spacing of 0.004 inch between the isolator plug or block 35 and the bore 33, along the plug length of about ½ inches provides a path of a shape to cool the combusted gases and quench a flame travelling from the interior of the transmitter housing to the exterior down the venting passageway before the flame reaches the atmosphere. Additionally, the passageway 35B provides a flame quenching path because of irs small diameter and an adequate length (as shown in the range of .52 inches) so that if the diaphragm 35A ruptures, and the isolator fluid is lost and a spark ignites a flame in the sensor chamber 44, the flame would be cooled and quenched before it reached the exterior end of the passageway 35B.

Passageway 51 is also of suitable size to provide for venting of the chamber 50 on the back side of the pressure sensor 45, through the interspace 52 and then through the threads 24, which are class 1 flame quenching threads, to the atmosphere. Threads are especially desirable as flame quenching paths because they provide a large cross sectional area for venting and resist plugging with contaminants.

If the weld 42 should fail, the isolator block 35 conceivably could be blown out of the central opening or passageway 32 of the sleeve-like fitting 26 upon ignition of a flame in chamber 44, but the capture ring 34 is provided for insuring that the 0.004 inch clearance between the block 35 and the bore portion opening 33 will not be lost even if the weld 42 fails. The capture ring 34 will hold the isolator block in safety position, even upon failure of a weld.

The bore portion 60 comprises a threaded connector that can be coupled to a pressure line along the central axis of the bore or opening 22, and the bore on the interior of the sleeve 23, which are coaxial. The pressure from the line connected to the sleeve-like fitting 26 provides pressure to the isolator diaphragm 35A so that process line pressure is coupled to the sensor 45 due to the filling of noncompressible fluid in the passageway 35B formed in the isolator block 35.

Sensor mounting block 41 forms a part of the plug assembly 25, and has a peripheral surface that forms the interspace 52 with a shape that cools flames and isolates the sensor cavity 50 and the circuit chamber 12 from the atmosphere in combination with the class 1 threads 24. The small diameter passageway 51 further provides for flame isolation between the atmospheric pressure cavity 50 and the atmosphere through the interspace 52 and threads 24.

Figure 3:
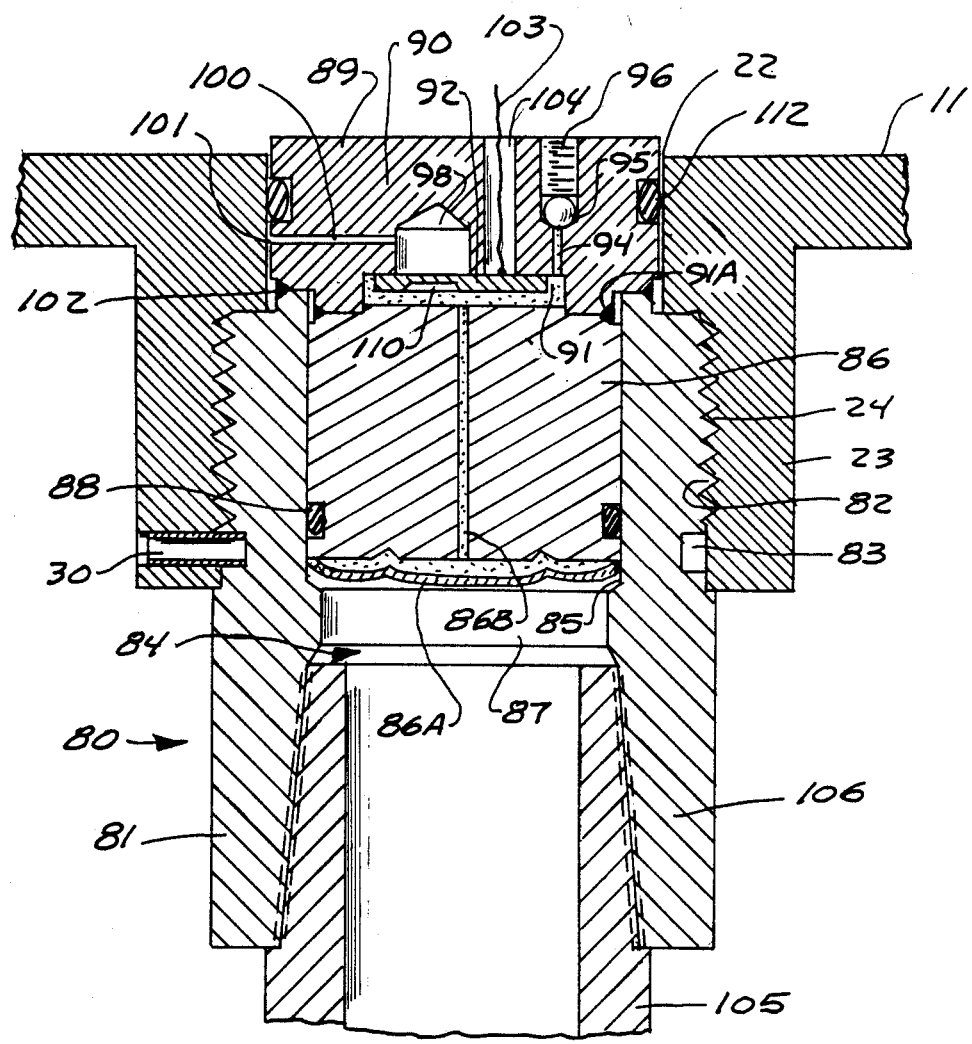
FIG. 3 is a sectional view of a modified plug made according to the present invention.

In FIG. 3, a modified form of the invention is illustrated, having the same capabilities of flame arresting as in the first form of the invention. A portion of the transmitter housing indicated at 11 is again shown, and in this form of the invention, the opening 22 is provided, along with sleeve 23 having the interior threads 24. The transmitter, of course, would have the circuit in the circuit compartment 12 as previously explained.

A plug assembly 80 includes a sleeve-like fitting 81 that also is provided with a threaded exterior end indicated at 82, that mates with the threads 24 on the interior of the sleeve 23 so that the plug assembly 80 can be threaded into the sleeve 23 or removed as desired. A roll pin 30 is also provided for fitting into a slot 83 to prevent the sleeve-like fitting 81 from unthreading.

An interior passageway 84 of the fitting 81 has a precisely formed bore portion 85 into which an isolator block 86 is placed. The spacing between the outer surface of the isolator block 86 and the interior surface of the bore portion 85 is kept in the range of 0.004 inches (diameter differences), and having a path length of in the range of ½ inch.

A capture ring 87 is provided to the lower edge of the bore portion 85, and it has a smaller internal diameter than the diameter of the isolator block 86.

The isolator block 86 has an thin flexible isolation diaphragm 86A at the end thereof adjacent the ring 87, which encloses a passageway 86B that is filled with isolator fluid as well as being a flame arresting passageway as will be explained. The isolator block 86 has an O-ring 88 thereon for sealing it relative to the surface of the bore portion 85.

A process pressure sensor assembly 89 includes a pressure sensor support block 90 which has a recess 91 at an end thereof facing the isolator block 86. The sensor support block 90, which is part of sensor assembly 89, is welded as at 91A to the isolator block 86 to form an assembly and seal the recess 91 around the periphery. The recess 91 is a sensor mounting recess, and a suitable pressure sensor 92 is mounted therein on an inner surface. The recess 91 forms a chamber that is open to the passageway 86B. The underside of the diaphragm 86A, the recess 91 and passageway 86B are filled with a silicone oil or other suitable noncompressible fluid. An oil fill passageway indicated at 94 is provided and opens to the recess 91. A ball closure valve 95 held in place with a suitable plug 96 closes the passageway 94 after filling fluid into the sensor isolator chambers and passageways.

An atmospheric pressure chamber 98 is provided on the opposite side of the sensor diaphragm portion 110 from the isolator block 86. Chamber 98 is connected with a small diameter flame arresting passageway 100 to an interspace 101 between the inner surface defining hole 22 and the outer periphery of the sensor mounting block 90. This interspace 101 is precisely sized with about 0.004 inches total diameter difference, for forming a flame quenching path to atmosphere through threads 24. The hole 100 is formed of suitable size and length to also form a flame quenching path leading to the interspace. It should also be noted that the sensor support block 90 is welded to the sleeve-like fitting 81 with a suitable weld 102.

A lead 103 is attached to the sensor 92 and passes outwardly through a suitable passageway 104 in this form of the invention. The sensor 92 is supported on its edges on the inner end of recess 91 and the diaphragm 110 will deflect under differences in pressure acting through the isolator diaphragm 86A with respect to atmosphere pressure in chamber 98.

A suitable pressure line connector or fitting 105 is threaded into the interior of a threaded portion 106 of the sleeve-like fitting 81, using conventional threads to provide process fluid pressure to the diaphragm 86A, and thus through passageway 86B and the noncompressible fluid in the chamber 91 to the diaphragm portion 110 of the pressure sensor 92. An O-ring 112 seals the outer surface of the sensor block 90 with respect to the surface of the bore or opening 22.

In each instance, again, the sensor recess or cavity 91, where ignition of combustible gases can occur is connected through flame arresting paths in all outlet paths leading toward the ambient atmosphere, which may be combustible. This includes the conventional class 1 threads 24 which have a long path length and low clearance, the annular space between the exterior surface of the isolator block 86 and the surface of bore portion 85, which has a clearance of about 0.004 inches and a path length of about ½ inch. This passageway would be open to atmosphere if the weld 91A failed, and flame from chamber 91 was present and was travelling toward the atmosphere. The capture ring 87 will hold the isolator block 86 within bore portion 85 so that the flame arresting path is maintained regardless of failure of such weld.

The passageway 86B, that is the isolator fluid passageway leading to recess 91, has a small diameter (0.015 in.) and a sufficient length so that it will quench flames that tend to travel to atmosphere through such opening 86B if there is a failure of the diaphragm 86A and discharge and loss of the isolating fluid.

The atmospheric chamber 98 is connected to atmosphere through a flame quenching passageway 100 which has a shape (0.015 in. diameter) sufficient for causing flame quenching, as does the interspace 101 between the periphery of the sensor plug 90 and the bore 22.

Thus by selecting the paths through the isolator 86 for presenting process fluid pressure to the sensor to have a configuration that provides flame quenching characteristics, and also selecting the paths that provide atmospheric pressure to such sensor to have flame quenching configurations or shapes, the transmitter is made to be intrinsically safe. The conventional threads on the cap shown at 14 for the transmitter housing also provide flame quenching paths. Flame quenching shapes also can be made by filling wider passageways with sintered or porous material.

The assembly shown provides for a low cost, safe sensor mounting plug without having a large number of high cost thread interfaces, the flame quenching paths are maintained in case of a failure of a weld or an isolator diaphragm with the present configuration to make the assembly intrinsically safe.

Although the present invention has been described with reference to preferred embodiments, workers skilled in the art will recognize that changes may be made in form and detail without departing from the spirit and scope of the invention.

What is claimed is:

1. A transmitter providing an output indicating a pressure difference between a line and an atmosphere outside the transmitter, comprising:
   a housing forming a wall around an axis of a hole extending into an interior cavity formed in the housing;
   a circuit in the interior cavity controlling the output and providing electrical excitation;
   a sensor receiving the electrical excitation for sensing the pressure difference; and
   a plug in the hole having a sensor cavity holding the sensor, a fitting couplable to the line along the axis at a distal end of the plug, and a diaphragm therein coupling line pressure to the sensor via a liquid in a first passageway formed in the plug, the first passageway having a first end open to the sensor's electrical excitation and a second end open to the line via the diaphragm, the first passageway having a shape which flame-isolates the electrically excited sensor from the line.

2. The transmitter of claim 1 wherein the plug has a peripheral surface in the hole adjacent the wall forming an interspace having a shape which flame-isolates the circuit from the atmosphere.

3. The transmitter of claim 2 wherein the plug has a second passageway coupling the sensor to the atmosphere, the second passageway being formed in a shape which flame-isolates the sensor from the atmosphere.

4. The transmitter of claim 3 wherein the second passageway couples to the atmosphere via the interspace.

5. The transmitter of claim 1 wherein said fitting is a sleeve-like fitting having a bore, a first block mounted in said bore forming part of said plug, the block closing the sensor cavity in a second block and having the diaphragm mounted therein and the first passageway therein, the space between the first block and the bore having a shape which flame isolates from the line.

6. The transmitter of claim 5 wherein the bore in the sleeve-like fitting includes a capture ring between the first block and the process fluid to insure that the block remains in the bore if the first block is separated from the second block and no longer closes the sensor cavity.

7. The transmitter of claim 1 wherein the plug comprises a fitting having an interior bore, a first isolator block, a second sensor mounting block having the sensor cavity in one end, the first isolator block being sealingly attached to the second block and closing the sensor cavity, the first block fitting into the bore to define a passageway around the first block having a shape which flame isolates the junctures between the first and second blocks from the exterior.

8. The transmitter of claim 7 wherein the fitting has an end surface and the sensor block has a shoulder defined thereon forming a neck which fits into the interior bore, and the shoulder fitting on the end surface.

9. A transmitter providing an output indicating a pressure difference between a line and an atmosphere outside the transmitter, comprising:
   a housing forming a wall around an axis of a hole extending into a cavity formed in the housing;
   a circuit in the cavity controlling the output;
   a sensor coupled to the circuit for sensing the pressure difference; and
   a plug in the hole having a sensor cavity holding the sensor, a block mounted in the plug and closing the sensor cavity, and a diagram at an end of the block coupling line pressure to the sensor via a liquid in a first passageway formed in the block when a line is connected to the plug, the first passageway having a shape which flame-isolates the sensor from the line whenever the diaphragm opens and the liquid can be discharged.

* * * * *

UNITED STATES PATENT AND TRADEMARK OFFICE
CERTIFICATE OF CORRECTION

PATENT NO. : 4,970,898

DATED : November 20, 1990

INVENTOR(S) : James E. Walish et al.

It is certified that error appears in the above-identified patent and that said Letters Patent is hereby corrected as shown below:

Col. 2, line 63, delete "class", insert --class 1--.

Col. 4, line 1, insert a --,-- after "53".

Col. 4, line 43, delete "irs", insert --its--.

Col. 8, line 34, delete "diagram", insert --diaphragm--.

Signed and Sealed this

Nineteenth Day of May, 1992

Attest:

DOUGLAS B. COMER

*Attesting Officer*         *Acting Commissioner of Patents and Trademarks*